United States Patent [19]

Mestric

[11] Patent Number: 5,822,481
[45] Date of Patent: Oct. 13, 1998

[54] WAVEGUIDE GRATING OPTICAL DEMULTIPLEXER

[75] Inventor: Roland Mestric, Paris, France

[73] Assignee: Alcatel Optronics, Paris, France

[21] Appl. No.: 772,529

[22] Filed: Dec. 24, 1996

[30] Foreign Application Priority Data

Dec. 28, 1995 [FR] France .................................. 95 15658

[51] Int. Cl.$^6$ ................................ G02B 6/00; G02B 6/36
[52] U.S. Cl. .................................................. 385/46; 372/6
[58] Field of Search ................................... 385/14, 31, 43, 385/46, 17, 39, 42, 45; 372/6, 92, 97, 64, 108, 99

[56] References Cited

U.S. PATENT DOCUMENTS

| | | | |
|---|---|---|---|
| 5,212,758 | 5/1993 | Adar et al. ................................ | 385/129 |
| 5,396,507 | 3/1995 | Kaminow et al. ......................... | 372/20 |
| 5,412,744 | 5/1995 | Dragone ..................................... | 385/24 |

OTHER PUBLICATIONS

"Wavelength Multiplexer Based on SiO2–TA205 Arrayed–Waveguide Grating", Journal of Lightwave Technology, vol. 12, No. 6, pp. 989–995 By Hiroshi Takahashi et al, Jun. 1994.

Hiroshi Takahashi et al, "Wavelength Multiplexer Based on SI02–TA205 Arrayed–Waveguide Grating", *Journal of Lightwave Technology*, vol. 12, No. 6, 1 Jun. 1994, pp. 989–995.

A. R. Vellekoop et al, "A Small–Size Polarization Splitter Based on a Planar Optical Phased Array", *Journal of Lightwave Technology*, vol. 8, No. 1, 1 Jan. 1990, pp. 118–124.

*Primary Examiner*—Akm E. Ullah
*Attorney, Agent, or Firm*—Sughrue, Mion, Zinn, Macpeak & Seas, PLLC

[57] ABSTRACT

The demultiplexer has two couplers connected together by a grating of waveguides that are all of different lengths. To make a grating component of low order and that occupies little space, each waveguide has three adjacent segments having radii of curvature that are respectively positive, negative, and positive. The demultiplexer is particularly applicable to duplex optical communications.

20 Claims, 4 Drawing Sheets

WAVEGUIDE GRATING OPTICAL DEMULTIPLEXER

The invention relates to the field of photon components, and more particularly it relates to wavelength demultiplexers.

BACKGROUND OF THE INVENTION

Such apparatuses are generally implemented in the form of integrated components and they have numerous applications in optical communications systems using a plurality of wavelengths. We consider more particularly below the case of broadband demultiplexers, i.e. demultiplexers designed to separate wavelengths that are relatively far apart. Such apparatuses can also be used as duplexers in emitter/recievers for duplex two-directional communications.

A particularly advantageous type of multiplexer or demultiplexer is constituted by two star couplers connected together by a grating constituted by an array of waveguides that are all of different lengths. Unfortunately, to make a broadband demultiplexer of that type, it is necessary to select an array of low order. The order m is defined by: $m = n\Delta L/\lambda_o$, where n is the effective refractive index of the waveguide-constituting medium, $\Delta L$ is the pitch of the grating, i.e. the difference in length between two adjacent waveguides, and $\lambda_o$ is the mean wavelength in a vacuum of the input multiplex.

Since the difference $\Delta\lambda$ between the extreme wavelengths is also inversely proportional to the order m of the grating, it is necessary to select a grating of low order, e.g. equal to 2 or 3. As a result, the pitch $\Delta L$ is small which leads to difficulties in establishing paths for the waveguides.

U.S. Pat. No. 5,212,758 gives a solution for making an array of waveguides at small pitch. That solution relies on a so-called "S-configuration" and comprises three distinct sections: two semi-circular sections on either side of a curved central section. Although it enables the looked-for result to be achieved, that solution is not optimal from the point of view of grating size.

OBJECTS AND SUMMARY OF THE INVENTION

In order to improve said size, the invention provides a wavelength demultiplexer comprising first and second star couplers and a grating of waveguides all of different lengths, each coupler having a cylindrical coupling face, said waveguides having first and second ends connected respectively to the coupling faces of said first and second couplers perpendicularly to said faces and at points whose positions along each face satisfy a linear function of said lengths, wherein the path of each waveguide comprises in succession first, second, and third adjacent segments having respective radii of curvature that are positive, negative, and positive, with the concave sides of said first and third segments of the longest of the waveguides being oriented towards the other waveguides of the grating.

The technology used, and above all the choice of structure for the waveguides, impose an absolute lower limit on the values that can be taken by the radii of the waveguides. Thus, when said minimum value does not make it possible to achieve the path with the above-specified three segments only, it is advantageous for the first and/or second ends of the waveguides to be rectilinear.

In another embodiment seeking to simplify computation of waveguide paths, the waveguides are provided symmetrically about a plane.

Also, the compactness of the apparatus is improved if the longest waveguide of the grating has a central segment that is rectilinear. For the same purpose, the first and third segments of said longest waveguide should have a radius of curvature of minimum value which conserves the waveguiding properties within said waveguide.

In a variant, it is also possible to provide a demultiplexer by means of a waveguide grating that operates in reflection. In this variant of the invention, the demultiplexer comprises a star coupler and a grating made up of waveguides that are all of different lengths and that terminate in reflecting faces, said coupler including a cylindrical coupling face, said waveguides including ends that are connected to said coupling face perpendicularly at points whose positions on said face satisfy a linear function of said lengths, wherein the path of each waveguide includes two adjacent segments having respective positive and negative radii of curvature such that said reflecting faces lie in a common plane.

BRIEF DESCRIPTION OF THE DRAWINGS

Other aspects and advantages of the invention appear in the description below given with reference to the figures, in which.

MORE DETAILED DESCRIPTION

Figure 1:
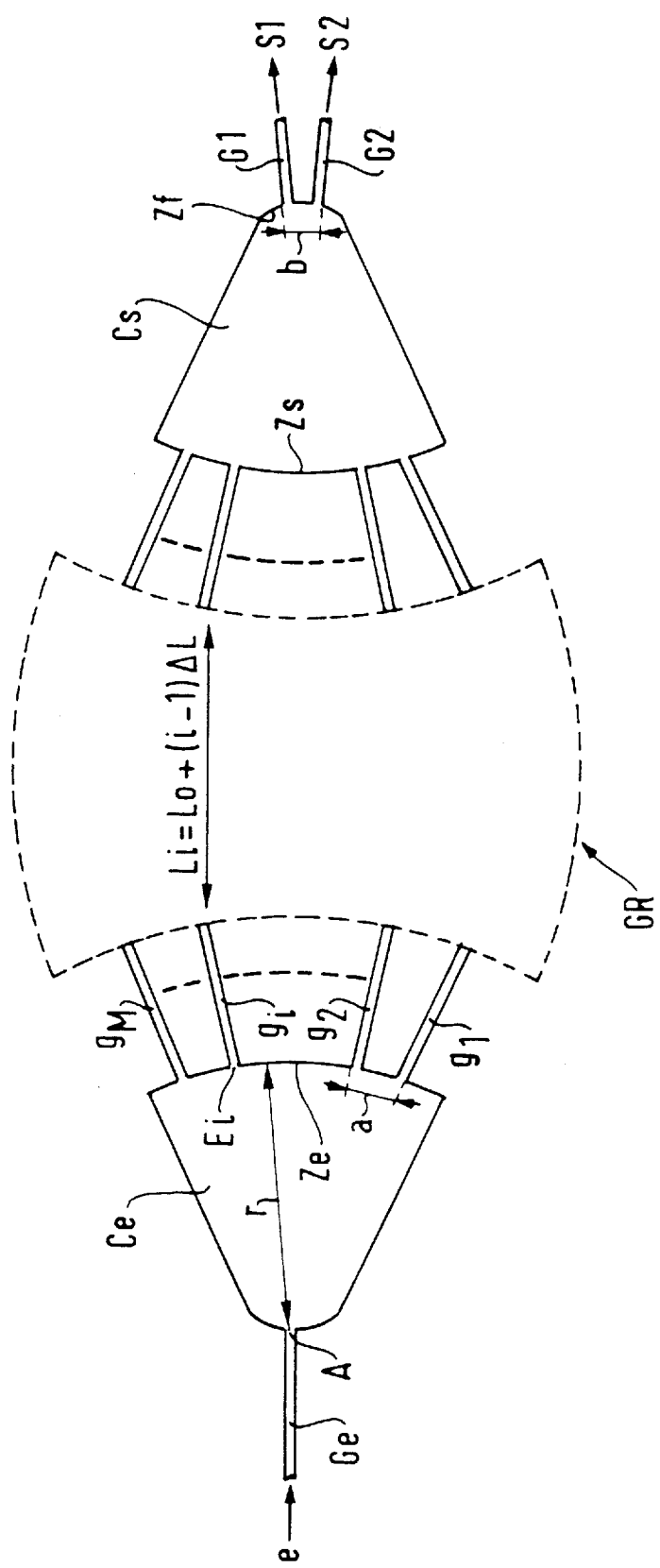
FIG. 1 is a diagram of a demultiplexer having a waveguide grating to which the invention can be applied.

FIG. 1 is a diagrammatic plan view of a demultiplexer having a waveguide grating.

It is constituted by a first star coupler Ce whose input A is connected to an input waveguide Ge. The face of the coupler Ce remote from the input waveguide Ge constitutes a coupling face Ze which is connected to the input of a grating GR made up of waveguides $g_1, \ldots, g_i, \ldots, g_m$. The other end of the grating GR is connected to another coupling face Zs belonging to a second star coupler Cs. Its face Zf remote from the coupling face Zs constitutes a focusing surface which is connected to output waveguides G1 and G2. The waveguides G1 and G2 provide respective output signals S1 and S2 at respective wavelengths $\lambda 1$ and $\lambda 2$.

In an integrated embodiment, the couplers and the waveguides are constituted by light-guiding layers that are thin relative to the other dimensions of the apparatus.

Geometrically speaking, the two opposite faces in each coupler connected to the waveguides are cylindrical and of the same radius. Generally, both couplers are of identical dimensions.

To obtain the demultiplexing function, the waveguides $g_i$ are all of different lengths $L_i$, and their coupling points Ei are at positions on the faces Ze and Zs that correspond to a linear function of said lengths. For reasons of compactness and of simplicity, the assembly is symmetrical and the coupling points Ei are regularly spaced apart along the coupling surfaces Ze and Zs. The length of waveguide $g_i$ of order i is then given by $L_i = Lo+(i-1)\Delta L$ where Lo is the length of the shortest waveguide $g_1$, and $\Delta L$ is the pitch of the grating.

If λo is the length of the mean wavelength of the input multiplex in a vacuum, then $\Delta L$ may be selected to be equal to mλo/n, where m is the order of the grating and n is the effective refractive index of the light-guiding layers of the grating.

In operation as a demultiplexer, the multiplex e is injected into the first coupler Ce via the input guide Ge. The various wavelengths constituting the multiplex are then focused on the inputs of the output waveguides G1 and G2.

The wavelength-separating property of this apparatus is independent of the direction of propagation, so it is possible to use it as a demultiplexer in an emitter/receiver for a "full duplex" communications systems, i.e. a system that is two-directional, operating via a single fiber and simultaneously in both directions. Under such circumstances, the received signal as carried for example by wavelength λ1 is injected into the coupler Ce by the waveguide Ge and is detected at the output of waveguide G1. The signal to be emitted, carried at wavelength λ2, is injected into the coupler Cs via waveguide G2 and is then emitted over waveguide Ge.

As soon as a particular manufacturing technology has been chosen, together with an appropriate structure for the waveguides, the demultiplexer can be dimensioned essentially as a function of the extreme wavelength values that are to be separated. Also, the number M of waveguides in the grating is selected as a function of the difference between the adjacent wavelengths that are to be separated so as to optimize the spectral response of the output signals.

Thus, when it is desired to use the apparatus as a duplexer, the following may apply, for example:

$\lambda_1 = 1.31$ μm $\lambda_2 = 1.55$ μm $\Delta\lambda = \lambda_2 - \lambda_1 = 0.24$ μm M=6 to 10

λo=1.46 μm

The geometrical parameters of the apparatus that then need to be determined are as follows:

r=radius of the coupling and focusing faces Ze and Zs;

a=separation between the centers of the waveguides of the grating at the couplers;

b=distance between the centers of the output waveguides corresponding to the extreme wavelength values, at the output coupler; and m=order of the grating.

Figure 2:
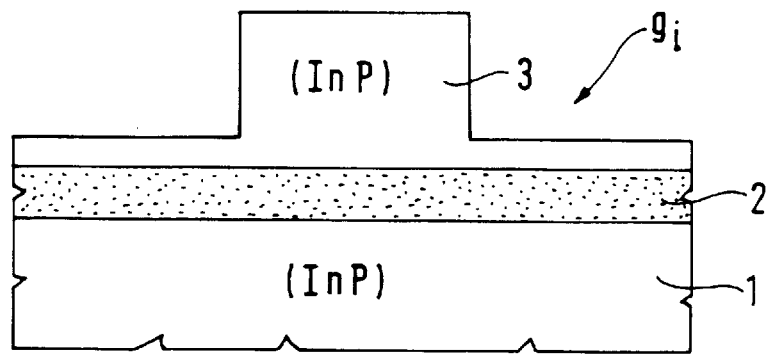
FIG. 2 is a cross-section through an embodiment of the waveguides of the grating.

Before describing one possible method of calculating the path, we describe with reference to FIG. 2 a structure that is suitable for making the waveguides $g_i$ of the arrayed-waveguide grating. The structure is of the ridge type, and it is integrated on a substrate of indium phosphide. The light-guiding layer 2 is initially buried in a vertical confinement layer. To form the waveguide, lateral etching is performed in the confinement layer down to the etching stop layer situated above the light-guiding layer 2. The portion 3 of the confinement layer that remains after etching provides lateral confinement that imparts the property of laterally guiding waves in the layer 2.

Dimensionally, the following may apply, for example:

thickness of the light-guiding layer 2: 0.3 μm;

width of the portion 3: 1.5 μm;

depth of etching: 0.9 μm; and distance between the layer 2 and the top of the waveguide: 1 μm.

With this structure, the effective refractive index n is about 3.25 and the minimum radius of curvature of the waveguide is of the order of 1.2 mm.

Figure 3:
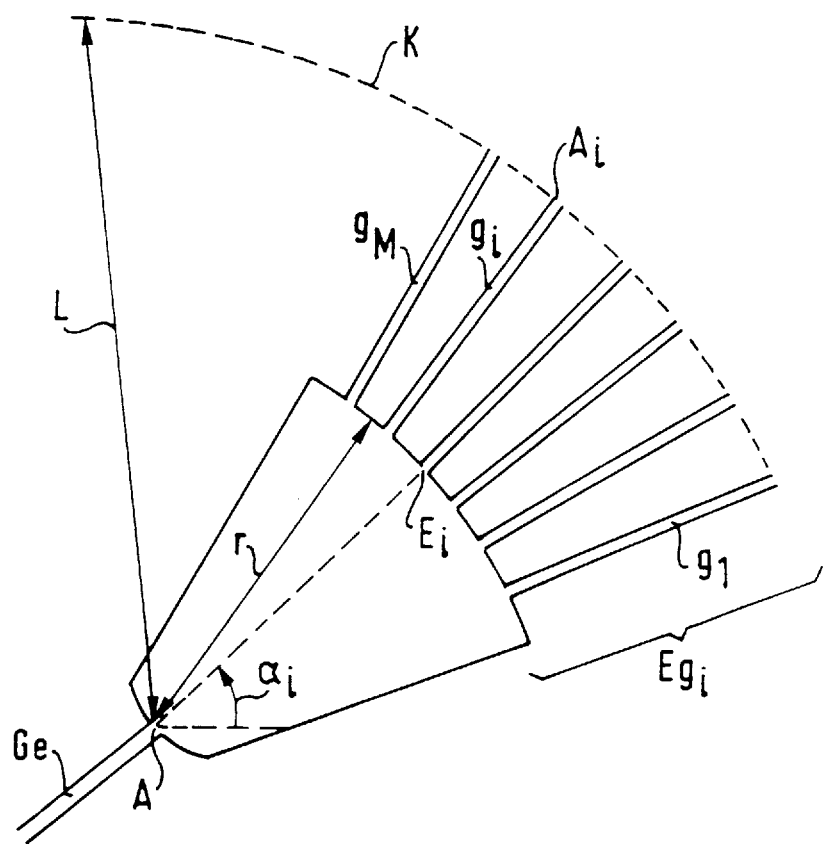
FIG. 3 shows one of the couplers connected to the rectilinear ends of the waveguides.

In practice, it is preferable for the waveguides to be suitably far apart before presenting any curvature. For that purpose, it is possible to provide an extension of the couplers by means of rectilinear waveguide ends $Eg_i$, as shown in FIG. 3. When these ends are of the same length, the curved portions of the waveguides begin from a circular arc K centered on the input A and of radius L. For example, for the waveguide $g_i$ extending at angle $\alpha_i$, the curved portion begins at point $A_i$ situated on the arc K.

It is nevertheless possible to omit such rectilinear ends by increasing the confinement of the waveguides. Also, increasing the confinement makes it possible to reduce the minimum acceptable value for radius of curvature. For that purpose, it suffices, for example, to place the etching stop layer beneath the light-guiding layer.

Also, it is possible for said rectilinear portions to be of differing lengths, and for some of them to be of zero length.

Figure 4:
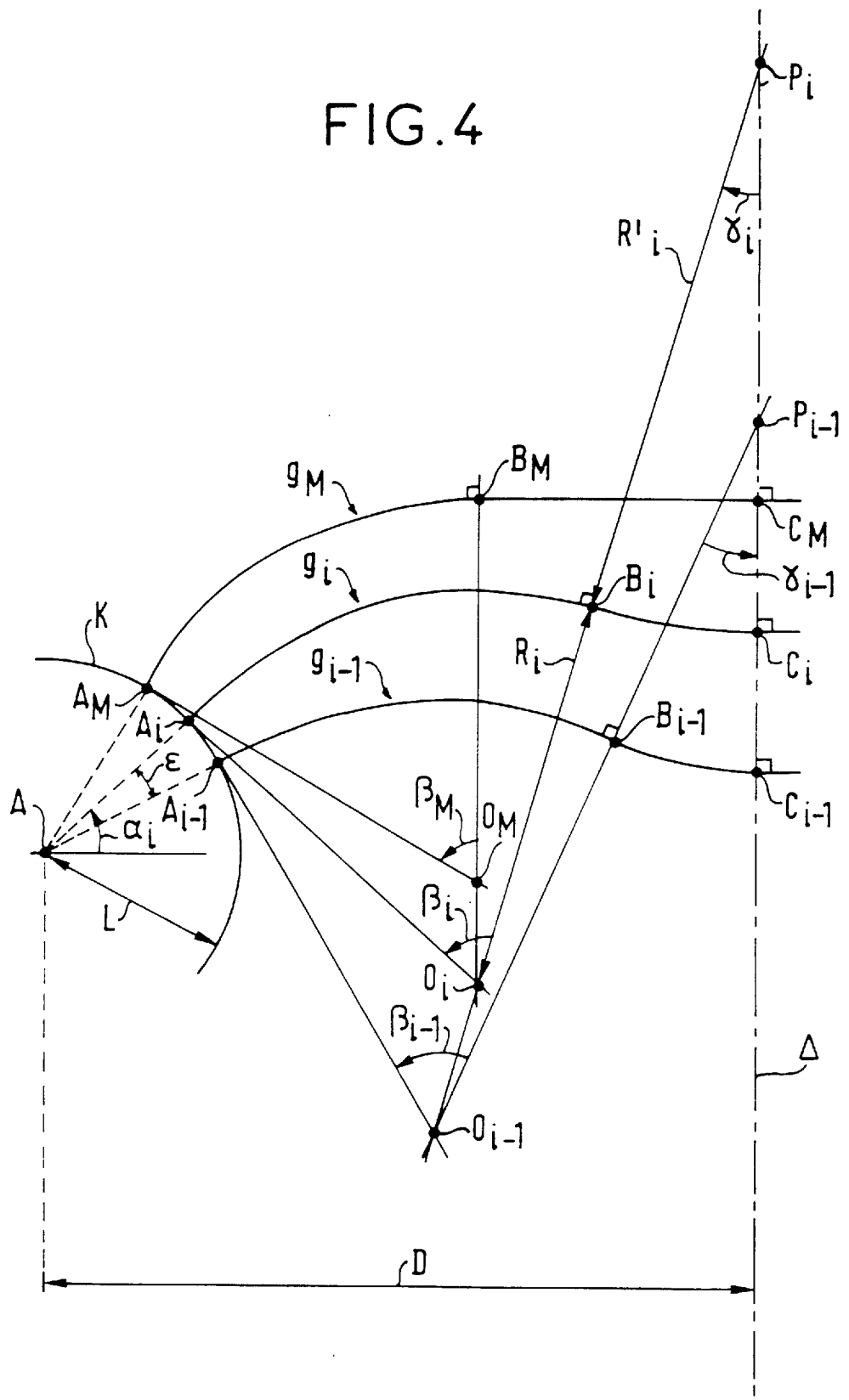
FIG. 4 serves to explain a method that can be used for establishing the paths of the waveguides of the grating.

Thereafter the path followed by the waveguides is determined as explained below with reference to FIG. 4. There are M waveguides and their rectilinear ends are disposed as shown in the figure. Initially, a straight line $\Delta$ is located corresponding to the plane of symmetry of the waveguides. A priori, the position in which this line is placed is arbitrary, and it can be altered if the final path of the grating gives rise to an impossibility such as requiring one or more guides to cross over. By way of example, an orientation is selected that is perpendicular to the rectilinear end of the first waveguide $g_1$ and that is at a distance D from the input A. The distance D is of the same order of magnitude as the minimum radius of the waveguides.

Because of symmetry, it suffices to determine the path of one-half of each waveguide, and thereafter to finish off the waveguide symmetrically about the straight line $\Delta$.

It is also necessary for the curved portions of the waveguides to be constituted by consecutive circular arcs that are tangential to one another and that have radii of curvature of opposite signs. Finally, the first circular arc of each waveguide must be tangential to its rectilinear portion, i.e. it must be perpendicular to the arc K (or to the arc formed by the face Ze). Similarly, the second circular arc is perpendicular to the straight line $\Delta$. Each waveguide $g_i$ is defined by the angle $\alpha_i$ of its rectilinear portion relative to a perpendicular to the straight line $\Delta$, and by the two successive arcs $A_iB_i$ and $B_iC_i$. The arc $A_iB_i$ is itself defined by its center $O_i$, its radius $R_i$, and its angle at the center $\beta_i$. The arc $B_iC_i$ is defined by its center $P_i$, its radius $R'_i$ and its angle at the center $\gamma_i$.

Given the above notation and the previously-defined notation, it is necessary for all i that the following conditions be satisfied:

$$\alpha_i - \alpha_{i-1} = \epsilon, \text{ with constant } \epsilon \quad (1)$$

$$L_i = Lo + (i-1)\Delta L \quad (2)$$

$$L_{i-1} = L_i - \Delta L \quad (3)$$

$$L_i = 2(L - r + R_i\beta_i + R'_i\gamma_i) \quad (4)$$

$$L \cos \alpha_i + R_i[\sin (\beta_i - \gamma_i) + \sin \gamma_i] + R'_i \sin \gamma_i = D \quad (5)$$

$$\beta_i - \gamma_i = \alpha_i \quad (6)$$

$$R_i\beta_i + R'_i\gamma_i = R_{i-1}\beta_{i-1} + R'_{i-1}\gamma_{i-1} + \Delta L \quad (7)$$

in which all the magnitudes given are positive.

In practice, the procedure begins with the longest path $g_M$. The value selected for the radius $R_M$ is the minimum radius of curvature acceptable in the waveguide structure. An infinite radius $R'_M$ is also set. These two conditions determine the center $O_M$ and therefore define the arcs $A_M B_M$ and $B_M C_M$.

For the path of the following waveguide $g_i$, a center $O_i$ is selected as the intersection of the tangent at $A_i$ to the arc K and the line parallel to $\Delta$ and passing through $O_M$. The arc at the center $\beta_i$ is calculated using equation (7), with $R'_i$ being given as a function of $\beta_i$ by equation (5).

Similarly, to determine the following arc $g_{i-1}$, the center $O_{i-1}$ is selected as the intersection between the tangent at $A_{i-1}$ to the arc K and the straight line $O_i B_i$. The angle $\beta_{i-1}$ is also computed by means of equation (7), $R'_{i-1}$ being given as a function of $\beta_{i-1}$ by equation (5).

If it turns out when applying the above method that certain waveguides cross each other or come too close together, then it is necessary to change the position of $\Delta$.

Figure 5:
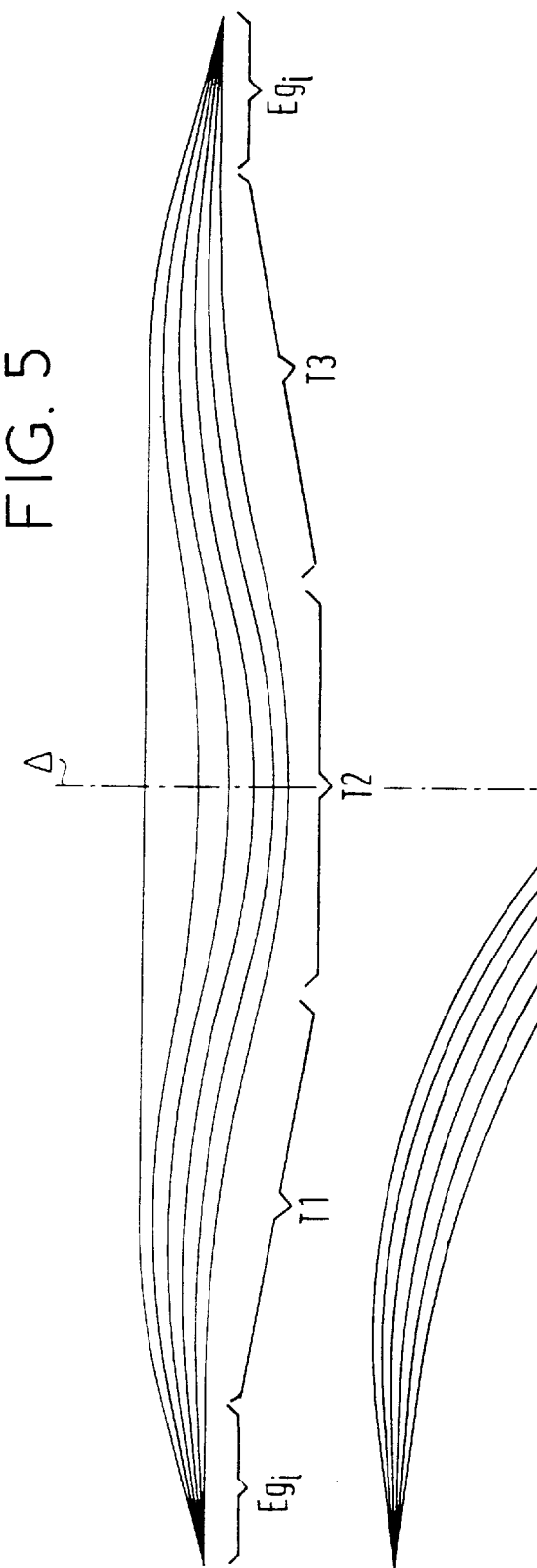
FIG. 5 is an overall view of a particular embodiment of a demultiplexer of the invention.

By way of illustration, FIG. 5 shows a path obtained by the above method for the previously mentioned duplexer. Taking:

a=2.2 μm
b=3.0 μm
r=45 μm
ΔL=0.88 μm
M=6
m=2, the overall length of the assembly is 2.5 mm and its width is 250 μm.

Figure 6:
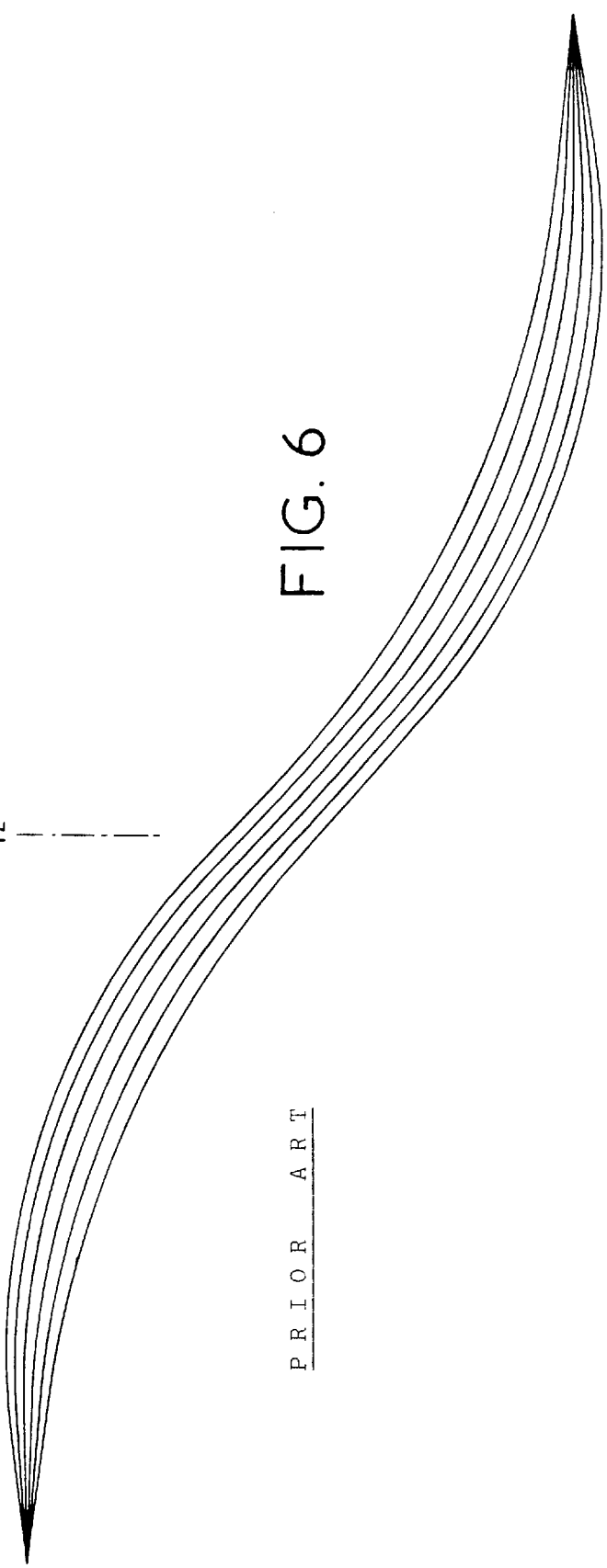
FIG. 6 shows a path of an equivalent demultiplexer in the prior art.

By way of comparison, FIG. 6 shows the path of a duplexer having the same characteristics and using the prior art method.

A variant embodiment consists in using the waveguide grating in reflection. Under such circumstances, only one coupler is used together with a half-grating of waveguides terminated by reflecting faces. By using the above path-drawing method, the reflecting faces can be implemented merely by cleaving the component along the straight line $\Delta$.

The invention is not limited to the single embodiment described above. Thus, the pitch of the grating need not be constant. Similarly, it is possible to omit implementing waveguides that receive zero or negligible optical power.

Finally, the lengths of the waveguides may be considered in terms of optical path lengths for the purpose of taking into account possible variations in the effective refractive index n along the structure thereof.

I claim:

1. A wavelength demultiplexer comprising first and second star couplers and a grating of waveguides all of different lengths, each coupler having a cylindrical coupling face, said waveguides having first and second ends connected respectively to the coupling faces of said first and second couplers perpendicularly to said faces and at points whose positions along each face satisfy a linear function of said lengths, wherein each waveguide extends along a path of each that comprises in succession first, second, and third adjacent segments having respective radii of curvature that are positive, negative, and positive, with the concave sides of said first and third segments of the longest of the waveguides being oriented towards the other waveguides of the grating.

2. A demultiplexer according to claim 1, wherein said first and/or second ends are rectilinear.

3. A demultiplexer according to claim 1, wherein said waveguides are symmetrical about a plane.

4. A demultiplexer according to claim 3, wherein the longest waveguide of the grating includes a central section whose radius of curvature is infinite.

5. A demultiplexer according to claim 4, wherein the first and second segments of said longest waveguide have a radius of curvature having the minimum value for which the wave-guiding properties of said waveguide are conserved.

6. A wavelength demultiplexer comprising a star coupler and a grating of waveguides all of different lengths terminating in reflecting faces, said coupler including a cylindrical coupling face, said waveguides having ends connected to said coupling face perpendicularly at points whose positions on said face satisfy a linear function of said lengths, wherein the path of each waveguide includes two adjacent sectors having respective radii of curvature that are positive and negative such that said reflecting faces lie in a common plane.

7. A demultiplexer according to claim 6, wherein said ends are rectilinear.

8. A demultiplexer according to claim 6, wherein the longest waveguide of the grating has a second segment whose radius of curvature is infinite.

9. A demultiplexer according to claim 8, wherein the first segment of said longest waveguide has a radius of curvature of the minimum value for which the wave-guiding properties of said waveguide are conserved.

10. A method of sending optical communications by the use of a demultiplexer according to claim 1 as a two-directional emitter/receiver in a duplex optical communications system, comprising the steps of:

injecting a first signal through said first star coupler and detecting said first signal as it exits said second star coupler; and injecting a second signal into said second star coupler and emitting said second signal from said first star coupler.

11. A wavelength demultiplexer comprising:

a first star coupler;

a grating comprised of a plurality of waveguides each having a different length, wherein each of said waveguides extends along a continuous path that comprises in succession a first arcuate segment, and a second segment that terminates in a reflecting face;

wherein one of said waveguides includes a rectilinear second segment, and all said second segments but said rectilinear second segment are arcuate; and wherein said grating is connected to said first star coupler such that all said reflecting faces lie in a common plane.

12. A wavelength demultiplexer according to claim 11, wherein each waveguide having an arcuate second segment further comprises a point of inflection between its first segment and its second segment.

13. A wavelength demultiplexer according to claim 11, wherein each waveguide having an arcuate second segment is configured such that its arcuate first segment is tangential to its arcuate second segment.

14. A wavelength demultiplexer comprising:

a first and a second star coupler;

a grating comprised of a plurality of waveguides each having a different length, wherein each of said plurality of waveguides extends along a continuous path that comprises in succession an arcuate first segment, a second segment, and an arcuate third segment;

wherein one of said waveguides includes a rectilinear second segment, and all said second segments but said rectilinear second segment are arcuate;

wherein said grating is connected between said first and said second star couplers.

15. A wavelength demultiplexer according to claim 14, wherein each waveguide having an arcuate second segment further comprises a point of inflection between its first segment and its second segment.

16. A wavelength demultiplexer according to claim 15 wherein each waveguide having an arcuate second segment further comprises a point of inflection between its second segment and its third segment.

17. A wavelength demultiplexer according to claim 14, wherein each waveguide having an arcuate second segment is configured such that its arcuate first segment is tangential to its arcuate second segment, and its actuate second segment is tangential to its arcuate third segment.

18. A wavelength demultiplexer according to claim 14, wherein said rectilinear second segment is located such that all arcuate second segments are on one side thereof.

19. A wavelength demultiplexer according to claim 14, wherein said waveguide having said rectilinear second segment further includes a first segment that has a radius of curvature equal to the minimum value for which the waveguiding properties of said waveguide are conserved.

20. The method of sending optical communications according to claim 10, wherein said step of injecting a first signal and said step of injecting a second signal are performed simultaneously.

\* \* \* \* \*